US010313171B2

(12) United States Patent
He et al.

(10) Patent No.: US 10,313,171 B2
(45) Date of Patent: Jun. 4, 2019

(54) SEQUENCE WITH A LOW PAPR DESIGN METHOD FOR WIRELESS COMMUNICATION SYSTEM

(71) Applicant: ZTE Wavetone Science and Technology Ltd., Nanjing, Jiangsu (CN)

(72) Inventors: Shiwen He, Jiangsu (CN); Guangshi Yu, Jiangsu (CN); Haiming Wang, Jiangsu (CN); Lin Tian, Jiangsu (CN); Lyuxi Yang, Jiangsu (CN); Jun Zhang, Jiangsu (CN)

(73) Assignee: ZTE Wavetone Science and Technology Ltd., Nanjing, Jiangsu (CN)

( * ) Notice: Subject to any disclaimer, the term of this patent is extended or adjusted under 35 U.S.C. 154(b) by 0 days.

(21) Appl. No.: 15/506,280

(22) PCT Filed: Dec. 29, 2014

(86) PCT No.: PCT/CN2014/095298
§ 371 (c)(1),
(2) Date: Feb. 24, 2017

(87) PCT Pub. No.: WO2016/029611
PCT Pub. Date: Mar. 3, 2016

(65) Prior Publication Data
US 2017/0264474 A1    Sep. 14, 2017

(30) Foreign Application Priority Data

Aug. 26, 2014 (CN) .......................... 2014 1 0425417

(51) Int. Cl.
*H04L 27/26* (2006.01)
*H04W 84/12* (2009.01)
*H04L 1/00* (2006.01)

(52) U.S. Cl.
CPC .......... *H04L 27/262* (2013.01); *H04L 1/0005* (2013.01); *H04L 27/2613* (2013.01); *H04L 27/2634* (2013.01); *H04W 84/12* (2013.01)

(58) Field of Classification Search
CPC . H04L 27/262; H04L 5/0048; H04L 27/2613; H04L 5/006; H04L 27/261;
(Continued)

(56) References Cited

U.S. PATENT DOCUMENTS

| | | | | |
|---|---|---|---|---|
| 6,201,870 B1 * | 3/2001 | Medard | ................ | H04L 9/0668 331/78 |
| 2004/0066740 A1 * | 4/2004 | Suh | ...................... | H04L 5/0048 370/208 |

(Continued)

FOREIGN PATENT DOCUMENTS

| | | |
|---|---|---|
| CN | 101110809 | 1/2008 |
| CN | 103685130 | 3/2014 |

(Continued)

OTHER PUBLICATIONS

International Search Report of PCT/CN2014/095298 dated May 27, 2015, 4 pages (English and Chinese).

*Primary Examiner* — Sam K Ahn
*Assistant Examiner* — Sarah Hassan
(74) *Attorney, Agent, or Firm* — Rankin, Hill & Clark LLP

(57) ABSTRACT

A low PAPR sequence design method for a wireless communication system includes the following steps: setting relevant parameters of a designed sequence at first, then carrying out multiple iterations, generating multiple length-designated sequences having elements 0 and 1 and obeying the Bernoulli distribution of designated probability density parameters according to the parameters during primary iteration, screening the generated sequences according to the PAPRs of the sequences, updating the parameters of the next (Continued)

iteration based on the screened sequences, and finally mapping the sequence having the minimum PAPR to obtain a sequence with a low PAPR with elements of −1 and 1 after terminating the iterations. Compared with the prior art, the present invention allows the design of a sequence with a low PAPR with an arbitrary length, and the sequence only contains +1 and −1 as elements and has good autocorrelation performance.

6 Claims, 5 Drawing Sheets

(58) Field of Classification Search
CPC .............. H04L 27/2608; H04L 27/2647; H04L 27/2675; H04L 27/2692; H04L 45/24; H04L 5/0001; H04L 5/0058
See application file for complete search history.

(56) References Cited

U.S. PATENT DOCUMENTS

| | | | | |
|---|---|---|---|---|
| 2007/0098094 | A1* | 5/2007 | Yue | H04L 1/0043 375/260 |
| 2009/0110034 | A1* | 4/2009 | Kowalski | H04J 11/00 375/142 |
| 2011/0019719 | A1* | 1/2011 | Michaels | H04B 1/707 375/142 |
| 2012/0324315 | A1* | 12/2012 | Zhang | H04L 1/004 714/776 |
| 2013/0177089 | A1* | 7/2013 | Al-Safadi | H04L 27/2624 375/260 |

FOREIGN PATENT DOCUMENTS

| | | |
|---|---|---|
| CN | 103812817 | 5/2014 |
| CN | 104202285 | 12/2014 |
| WO | 2009031862 | 3/2009 |

* cited by examiner

SEQUENCE WITH A LOW PAPR DESIGN METHOD FOR WIRELESS COMMUNICATION SYSTEM

FIELD OF THE INVENTION

The present invention belongs to the technical field of wireless communication, and particularly relates to a low peak to average power ratio (Peak to Average Power Ratio, PAPR) sequence design method for a wireless communication system. a sequence with a low PAPR is used as a preamble in an orthogonal frequency division multiplexing (Orthogonal Frequency Division Multiplexing, OFDM) system to carry out channel estimation.

BACKGROUND

In an OFDM system, all the subcarriers are summed after an IFFT (Inverse Fast Fourier Transform, IFFT) operation, so a transmitted signal in the time domain will have a very high peak value. Therefore, compared with a single-carrier system, the OFDM system has a very high peak to average power ratio (Peak to Average Power Ratio, PAPR). In fact, the high PAPR not only reduces the efficiency of a transmitter power amplifier but also reduces the signal to quantization noise ratio (Signal to Quantization Noise Ratio, SQNR) of an analog to digital converter (Analog to Digital Converter, ADC) and a digital to analog converter (Digital to Analog Converter, DAC), so it is one of the most unfavorable factors in the OFDM system.

A low peak to average ratio sequence is very important and is widely used in an OFDM communication system. For example, the sequence with a low PAPR can be used as a channel estimation training field in a preamble. A transmitting end transmits the sequence with a low PAPR, and since the sequence with a low PAPR is unlikely for distortion in a transmission process, a receiving end can carry out channel estimation. Theoretical studies also indicate that sequence with low PAPRs usually have excellent autocorrelation performance, which is also a very important advantage in the OFDM wireless communication system.

At the same time, there are many restrictions on the generation of traditional sequence with low PAPRs. For example, constant envelope zero correlation sequences adopted in the LTE, such as a Zadoff-Chu sequence can only get a good PAPR performance at some lengths, and the generated sequence elements are different complex numbers, thereby increasing the implementation complexity.

BRIEF DESCRIPTION

Object of the Invention

The object of the present invention is to overcome the shortcomings in the prior art and provide a low PAPR sequence design method for OFDM communication. A sequence with a low PAPR with an arbitrary length can be generated by the method, and elements in the sequence only contain −1 and +1, and moreover, the method is simple to implement and is flexible to use.

In order to better understand the contents of the present invention, relevant technical backgrounds involved in the technical solutions of the present invention will be introduced at first: in an OFDM system, a high rate data flow is divided into N low rate data flows to be simultaneously transmitted by subcarriers. Each subcarrier is independently modulated by a typical modulation mode (e.g., PSK or QAM). An OFDM signal to be transmitted is generated by Inverse Fast Fourier Transform (IFFT). For an OFDM symbol $X=[X_0, \ldots, X_{N-1}]^T$, N represents the ordinal number of the subcarriers. A corresponding time domain baseband signal can be expressed as follows:

$$x(n) = \frac{1}{\sqrt{N}} \sum_{n=0}^{N-1} X_n e^{\frac{j2\pi nk}{LN}}, n = 0, 1, \ldots, LN - 1 \quad \text{(formula 1)}$$

wherein, L represents an oversampling factor.

For an OFDM system having N subcarriers, the PAPR of the transmission signal thereof is defined as follows:

$$PAPR = 10 \log_{10} \frac{\max\{|x(n)|^2\}}{E[|x(n)|^2]} \quad \text{(formula 2)}$$

wherein, E[ ] represents mathematical expectation, and max{ } represents taking the maximum value.

For a randomly generated sequence, a very low PAPR of the time domain signals thereof cannot be guaranteed, on the contrary, they may have very high PAPR, these signals are edited or compressed by excessive analog front ends in the transmission, and the properties of the sequence may lead to distortion.

Generally, each element of the sequence is deemed as a random variable, which obeys certain probability distribution, such as the Bernoulli distribution, and the probability distribution function thereof is as follows:

$$F_p(u) = u^p(1-u)^{1-p} = \begin{cases} u & \text{if } p = 1 \\ 1-u & \text{if } p = 0 \\ 0 & \text{otherwise} \end{cases} \quad \text{(formula 3)}$$

wherein, p represents the random variable, and u represents a probability distribution parameter. N elements of the sequence are generated by N times of independent Bernoulli experiments, and each element obeys the above probability distribution function. Each experiment is controlled by a distribution parameter $u=\{u_n\}_{n=1}^N$, wherein u represents a parameter vector. $u_n$ represents the probability of being 1 of the $n^{th}$ element in the sequence, and $1-u_n$ represents the probability of being 0 of the $n^{th}$ element in the sequence. Each element of the sequence is independently generated, and a specific sequence generation probability is as follows:

$$v(p; u) = \prod_{n=1}^N u_n^{p_n}(1-u_n)^{1-p_n}. \quad \text{(formula 4)}$$

Technical Solution

In a low PAPR sequence design method for a wireless communication system, the sequence with a low PAPR only contains elements −1 and +1, and the method includes the following steps: setting relevant parameters of a designed sequence at first, then carrying out multiple iterations until conforming to a termination condition, generating multiple length-designated sequences having elements of 0 and 1 and obeying the Bernoulli distribution of designated probability density parameters according to the parameters during primary iteration, screening the generated sequences according to the PAPRs of the sequences, updating the parameters of the next iteration based on the screened sequences, and finally mapping the sequence having the minimum PAPR to obtain a sequence with a low PAPR with elements of −1 and 1 after terminating the iterations. The method specifically includes the following steps:

step 1: the parameters of the designed sequence are set, and the parameters include: a sequence length N; the number J of random sequences generated every time; a sampling coefficient S, 0<S<1; an initial probability density function parameter (namely the probability density function parameter calculated in the primary iteration), $u=\{u_n\}_{n=1}^{N}=\{0.5\}_{n=1}^{N}$; an iteration termination condition: iterations T and/or a convergence condition threshold ε; and an initial PAPR value $V_{PAPR}^{old}=0$; and further, if there is a need to restrict the designed sequence, for example, the OFDM communication usually contains DC subcarriers and reserved subcarriers, and it is required that specific values are on some positions of the designed sequence. In step 1, limiting condition parameters can also be set: a limiting position domain C and a limiting position value W, for example, the positions of the DC subcarriers and the reserved subcarriers are the limiting position domain C, the values of these positions are usually set as 0, and the limiting position value W is equal to 0 at the moment.

Step 2: J random sequences obeying the Bernoulli distribution of parameters $u=\{u_n\}_{n=1}^{N}$ are generated by using the Monte Carlo method, and the generated J sequences can be represents as follows:

$$P_j=\{P_{j,n}\}_{n=1}^{N}, P_{j,n} \sim Ber(u_n), j=1,\ldots,J \quad \text{(formula 5)}$$

In the case that the limiting condition parameters are set in step 1, limiting conditions are applied to the generated sequences, and the sequences can be represented as follows:

$$P_j = \{P_{j,n}\}_{n=1}^{N} = \begin{cases} P_{j,n} \sim Ber(u_n), n \notin C \\ P_{j,n} = w_n, n \in C \end{cases}, \quad \text{(formula 6)}$$

$$j = 1, \ldots, J$$

Wherein, C represents the limiting position domain, and $W_n \in W$ represents the value of a limiting position element.

Step 3: PAPRs of mapping sequences $Q_j \in \{-1,+1\}^N$ of the generated sequences $P_j \in \{0,1\}^N$ are calculated, the minimum PAPR is selected from J PAPRs and is marked as $V_{PAPR}^{new}$, the threshold γ of the PAPR is set, and the threshold is used for screening the sequences participating in the calculation of updating iteration parameters; and since the elements of the designed sequence in the present invention are +1 and −1, and the values of random variables of a Bernoulli model are 0 and 1, mapping needs to be carried out herein, a mapping function can be $Q_j=1-2P_j$, $P_j$, $Q_j$, 1 all represent N-dimensional vectors, and the PAPR of the sequence $Q_j=1-2P_j$ mapped by the sequence $P_j$ is calculated as follows:

$$F(P_j) = 10\log_{10}\frac{\max\{|x(1-2P_j)|^2\}}{E[|x(1-2P_j)|^2]} \quad \text{(formula 7)}$$

wherein, x( ) represents IFFT, and $F(P_j)$ obtained by formula (7) is marked as $F(j)$, $j=1,\ldots,J$.

The specific steps of selecting the minimum PAPR and setting the threshold γ of the PAPR in step 3 include:

step 3.1: carrying out ascending sorting on $F(j)$, $j=1,\ldots,J$; that is:

$$\tilde{F}(j)_{j=1}^{J}=\text{sort}(F(j)_{j=1}^{J}) \quad \text{(formula 8)}$$

wherein, sort( ) represents an ascending sorting function of the sequences;

step 3.2: selecting the minimum PAPR $V_{PAPR}^{new}=\tilde{F}(1)$ obtained this time; and step 3.3: setting the threshold of the PAPR as:

$$\gamma=\tilde{F}(\lceil J \cdot S \rceil) \quad \text{(formula 9)}$$

wherein, ⌈ ⌉ represents an upward rounding function.

Step 4: whether the iteration termination condition is satisfied is judged, if so, step 6 is executed, and otherwise, step 5 is executed; in the case that the iterations are set, the termination condition includes reaching to the iterations, and in the case that the convergence condition threshold is set, the termination condition includes $|V_{PAPR}^{new}-V_{PAPR}^{old}|\leq\varepsilon$; and the convergence condition in step 4 is as follows: an absolute value of a difference of the minimum PAPRs in the sequences generated in front and back iterations is less than a certain threshold, which can be represented as follows:

$$|V_{PAPR}^{new}-V_{PAPR}^{old}|\leq\varepsilon \quad \text{(formula 10)}.$$

Step 5: the iteration parameters $V_{PAPR}^{old}$ and $u=\{u_n\}_{n=1}^{N}$ are updated, the value of the $V_{PAPR}^{new}$ is transmitted to the $V_{PAPR}^{old}=V_{PAPR}^{new}$, that is $V_{PAPR}^{old}=V_{PAPR}^{new}$, and $u_n$ is set according to the numerical value distribution condition of the $n^{th}$ sequence in all the sequences conforming to the threshold conditions of the PAPR in step 3; and step 2 is executed to enter the next iteration;

wherein, the computational formula for updating the $u=\{u_n\}_{n=1}^{N}$ is as follows:

$$\hat{u}_n = \frac{\sum_{j=1}^{J} \amalg(F(P_j) \leq \gamma)P_{j,n}}{\sum_{j=1}^{J} \amalg(F(P_j) \leq \gamma)}, n=1,\ldots,N \quad \text{(formula 11)}$$

wherein, $\amalg(\ )$ represents an indicating function: if and only if $F(P_j)\leq\gamma$, $\amalg(F(P_j)\leq\gamma)$ is equal to 1, and otherwise is equal to 0; and $P_j$ represents the $j^{th}$ sequence generated every time. $P_{j,n}$ represents the value of the $n^{th}$ element of the generated $j^{th}$ sequence. The Bernoulli parameter updated this time is used as the parameter of the sequence generated in the next iteration:

$$u=\{u_n\}_{n=1}^{N}=\{\hat{u}_n\}_{n=1}^{N} \quad \text{(formula 12)}$$

Step 6: the sequence $\hat{P}\in\{0,1\}^N$ corresponding to the minimum PAPR in step 3 is mapped to $\hat{Q}\in\{-1,+1\}^N$, the obtained $\hat{Q}$ is the designed sequence, and the mapping function is $\hat{Q}=1-2\hat{P}$.

Beneficial Effects:

Compared with the prior art, the present invention has the following advantages: first, the elements of the sequence in the present invention have the same module values and only have two phases, thereby being simpler than conventional transverse mode zero correlation sequences, such as the Zadoff-Chu sequence. The elements of the sequence are only composed of +1 and −1, thereby being easy to implement on both a transmitting end and a receiving end. Second, the length of the sequence in the present invention can be set by the parameters N, and the length of the sequence is controllable, thereby overcoming the limitations of the Gray sequence to the length of the sequence, and being very flexible to apply. Third, the design convergence of the sequence in the present invention is very fast, and the sequence can be generated offline and even online, so that the sequence can also be used in some occasions requiring random low PAPR codes. Fourth, the present invention can also design a sequence having limiting conditions to fix the values of elements on some positions of the sequence; and in the case of some limitations, such as DC subcarriers, reserved subcarriers and the like, global optimization can also be carried out to design a sequence with good PAPR properties. Fifth, actual measurement indicates that the designed sequences all have good autocorrelation performance, which is a very important advantage in relevant applications of the OFDM communication system.

DETAILED DESCRIPTION

The present invention will be further illustrated in combination with the accompanying drawings and specific embodiments. It should be understood that these embodiments are merely used for illustrating the present invention rather than limiting the scope of the present invention, and modifications in various equivalent forms made by those skilled in the art to the present invention and after reading the present invention shall all fall within the scope defined by the appended claims.

In the field of OFDM wireless communication, a sequence with a low PAPR has a variety of applications. For example, the sequence with a low PAPR is used as a long training field (Long Training Field, LTF) to carry out OFDM channel estimation, the limitations of DC subcarriers and reserved subcarriers need to be considered at the moment, and the sequence is required to be simple and meanwhile is expected to have good autocorrelation performance.

Design parameters are determined with IEEE 802.11.aj protocol architecture as reference in a millimeter wave wireless LAN communication scenario below. Considering this scenario, in the present implementation, training iterations are directly set as T=100, convergence judgment is not carried out successively, and a convergence process is intuitively demonstrated by drawing a curve. The design is carried out according to a sequence length N=256 and the number J=200 of sequences generated in every iteration, and the specific implementation of the present invention will be further illustrated in detail in combination with the accompanying drawings according to the limiting conditions of IEEE 802.11.aj DC subcarriers and virtual subcarriers.

Figure 1:
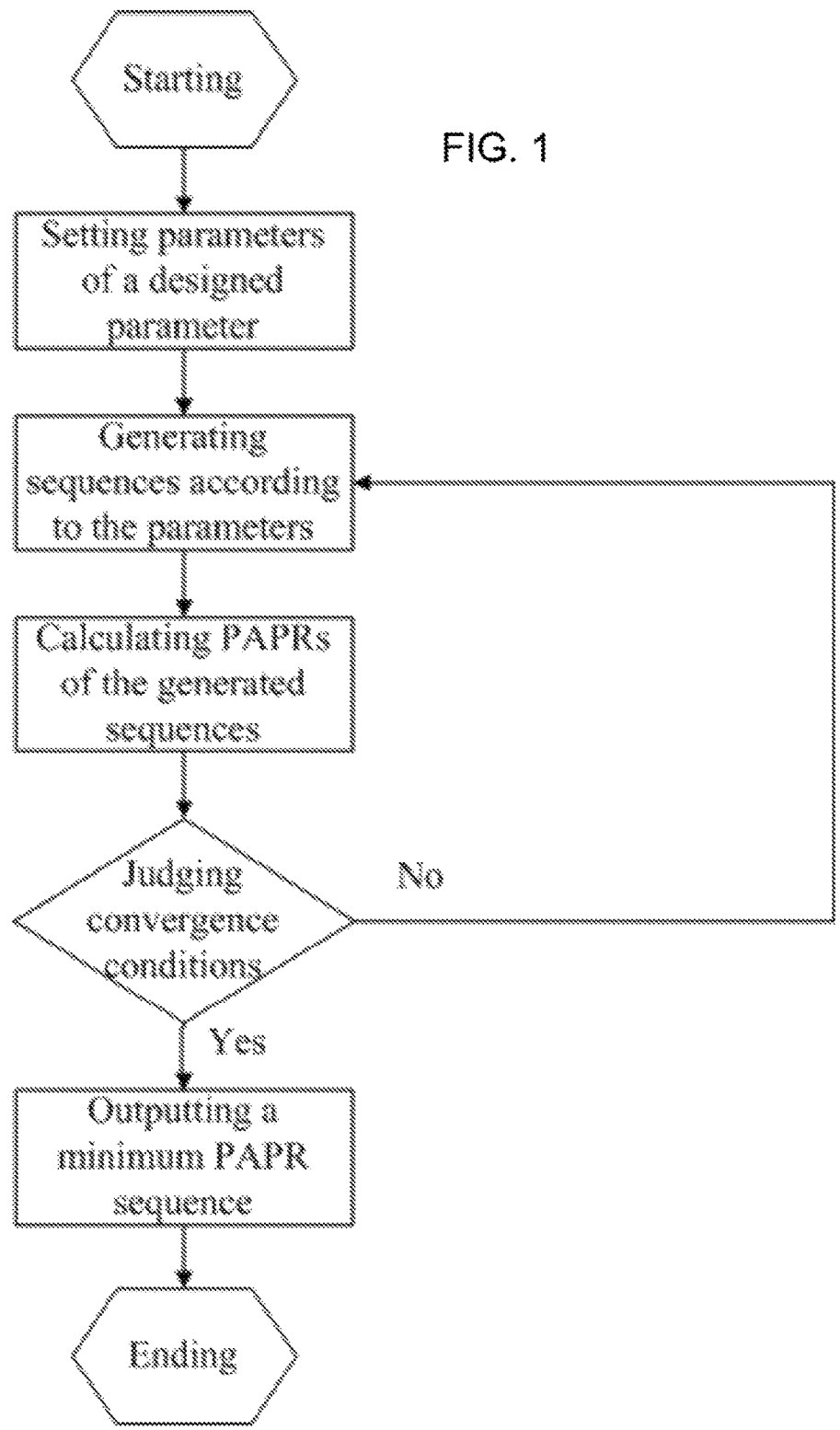
FIG. 1 is an overall flowchart of the method in the present invention.

As shown in FIG. 1, the present invention provides a low PAPR sequence design method for a wireless communication system. The specific steps are as follows:

(1): parameters of a designed sequence are set: the length of the designed sequence is N=256 the training time is T=100, the number of sequences generated every time is J=200, a sampling coefficient is S=0.2 an initial Bernoulli parameter is $u=\{u_n\}_{n=-128}^{127}=\{0.5\}_{n=-128}^{127}$, an initial PAPR value is $V_{PAPR}^{old}=0$, and a limiting position domain applied to the scenario can be represented as follows:

$C=(-128,-90)\cup(-1,+1)\cup(+90,+127)$, wherein $(-128,-90)\cup(+90,+127)$ represents the positions of reserved subcarriers, the values thereof are set as 0, and $(-1, 1)$ represents the positions of three DC subcarriers, and the values thereof are set as 0. J random sequences obeying the parameters are generated.

(2) The sequences are generated according to the parameters: 200 random sequences obeying the Bernoulli distribution of the parameters $u=\{u_n\}_{n=-128}^{127}$ are generated by using the Monte Carlo method, and the 200 generated sequences can be represents as follows:

$$P_j = \{P_{j,n}\}_{n=-128}^{127} = \begin{cases} P_{j,n} \sim Ber(u_n), n \notin C \\ P_{j,n} = 0, n \in C \end{cases} \quad \text{(formula 13)}$$

$$j = 1, \ldots, 200$$

(3) PAPRs of the generated sequences are calculated as follows: each generated sequence $P_j$ is mapped to $Q_j=1-2P_j$, then IFFT is carried out to obtain a time domain signal, and the PAPR of the time domain signal at the moment is calculated. The PAPRs of the 200 generated sequences are calculated according to formula 7, then get $F(P_j)$. Moreover, ascending sorting is carried out on the PAPR values of the group of sequences, a sampling coefficient is set as S=0.2 the first PAPR value is the minimum PAPR value after the ascending sorting, the $\lceil J \cdot S \rceil = \lceil 200 \times 0.2 \rceil = 40$ value is set as the threshold $\gamma$ of the PAPR of the sequence generated this time, and $\lceil \ \rceil$ represents an upward rounding function.

(4) Whether the times of iteration reach 100 is judged, if so, step (6) is executed, and otherwise, step (5) is executed. In order to obtain a comparison result with the traditional algorithm herein, the used iterations are used as an iteration termination condition, and a convergence condition of judging that an absolute value of a difference between the minimum PAPRs in the sequences generated in front and back iterations is less than a certain threshold can also be used as the iteration termination condition.

(5) Iteration parameters $u_n$ are updated by the generated sequences according to the following criterion:

$$\bar{u}_n = \frac{\sum_{1}^{200} \amalg(F(P_j) \leq \gamma) \cdot P_{j,n}}{\sum_{1}^{200} \amalg(F(P_j) \leq \gamma)}, n = -128, \ldots, 127 \quad \text{(formula 14)}$$

wherein, $\amalg(\ )$ represents an indicating function: when and only when $F(P_j) \leq \gamma$, $\amalg(P_j) \leq \gamma)$ is equal to 1, and otherwise is 0; and $P_j$ represents the $j^{th}$ sequence generated every time. $P_{j,n}$ represents the value of the $n^{th}$ element of the generated $j^{th}$ sequence, the parameters $u=\{u_n\}_{n=-128}^{127}=\{\bar{u}_n\}_{n=-128}^{127}$ of the next iteration are set to carry out the next iteration in step (2).

(6) The sequence $\hat{p}$ corresponding to the minimum PAPR in step (3) is mapped to $\hat{Q}=1-2\hat{p}$ to produce a sequence with a low PAPR.

Figure 2:
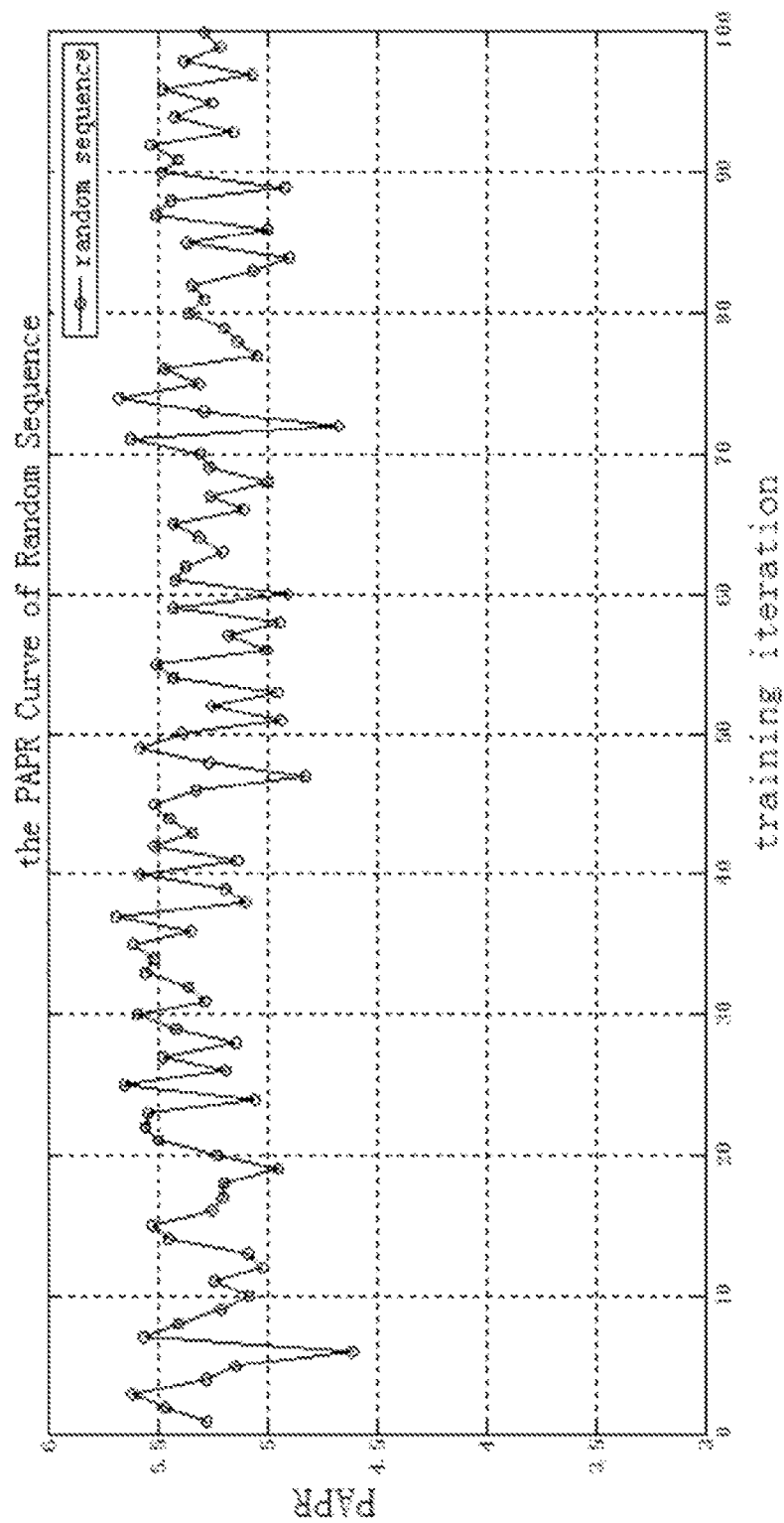
FIG. 2 is a trend line chart of every minimum PAPR value of 256-bit sequences randomly generated in 100 times.
Figure 3:
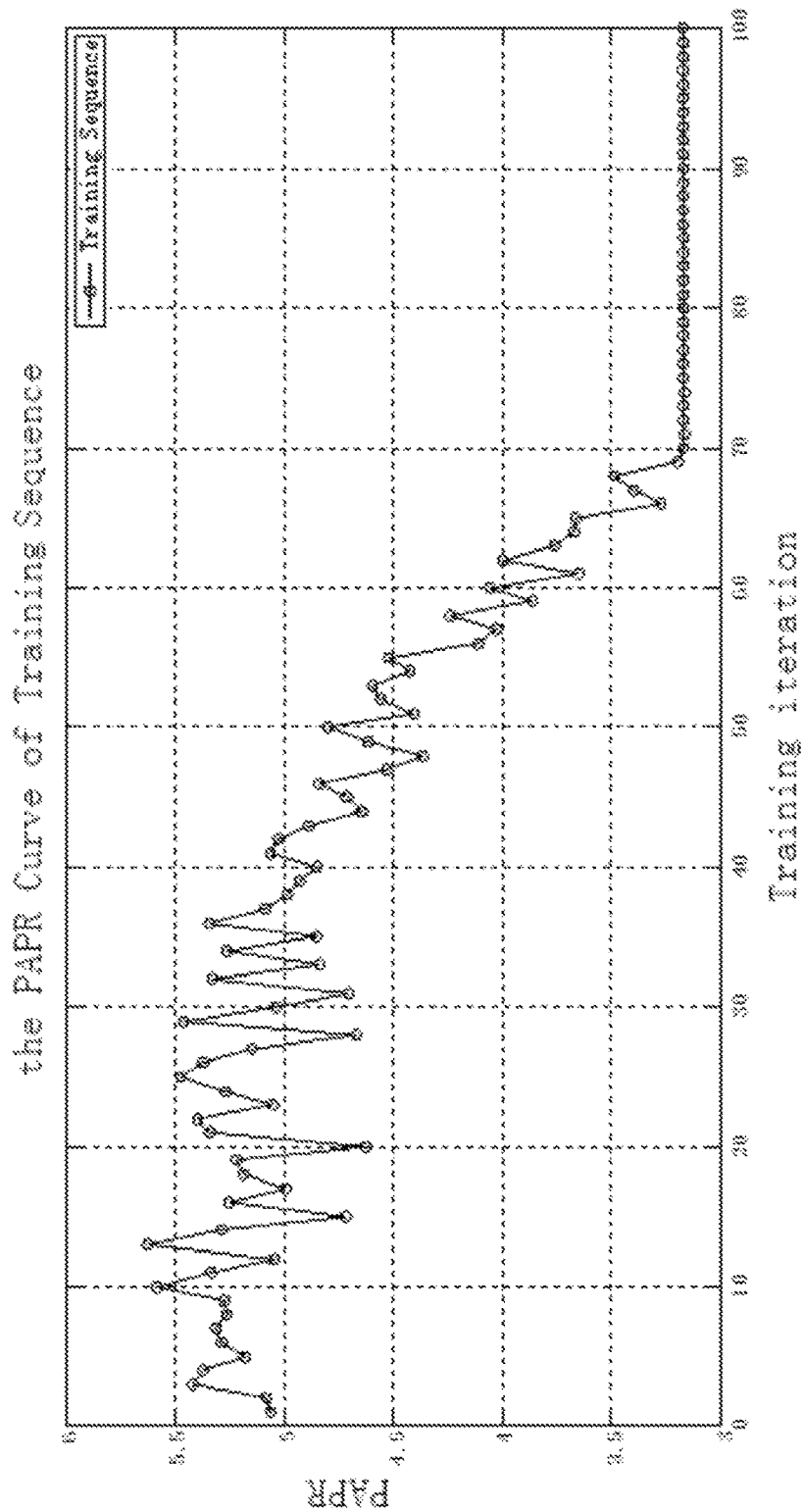
FIG. 3 is a trend line chart of every minimum PAPR value of 256-bit sequences iterating for 100 times in the present invention.

After each iteration is terminated, the probability distribution function has a higher probability of generating the sequence with a low PAPR, and the technical purpose of designing a low PAPR binary sequence is achieved by multiple iterations. After the termination of the iterations, the sequence having the minimum PAPR is selected. FIG. 2 represents a curve chart of the minimum PAPR value in each sequence in random sequences generated in 100 times without using the algorithm in the present invention. FIG. 3 shows a curve chart of the minimum PAPR value in each sequence in the sequences generated by 100 times of training by using the algorithm in the present invention. It can be obviously seen from the comparison of the two charts that the PAPR values of the randomly generated sequences fluctuate about 5.5 dB and fail for convergence. In the sequence designed by using the algorithm in the present invention, the convergence of the PAPR value of the designed sequence is realized quickly, and the minimum PAPR value of 3.17 dB of the present training is realized in the 70th training. In contrast, the PAPR of a 256-bit VHT-LTF sequence in the IEEE 802.11ac protocol reaches 8.6 dB. The training change process of probability parameters occurring in the previous 30 times of training on −89 to −83 positions in a training process will be shown in the following table.

TABLE 1

Changes of probability parameters in previous 30 times of training on a part of positions of the 256-bit sequence

| Training times | Sequence position | | | | | | |
|---|---|---|---|---|---|---|---|
| | −89 | −88 | −87 | −86 | −85 | −84 | −83 |
| 1 | 0.50000 | 0.50000 | 0.50000 | 0.50000 | 0.50000 | 0.50000 | 0.50000 |
| 2 | 0.40000 | 0.35000 | 0.60000 | 0.60000 | 0.45000 | 0.57500 | 0.40000 |
| 3 | 0.40000 | 0.31000 | 0.64000 | 0.50000 | 0.47000 | 0.59500 | 0.26000 |
| 4 | 0.32000 | 0.28200 | 0.54800 | 0.40000 | 0.47400 | 0.61900 | 0.27200 |
| 5 | 0.40400 | 0.37640 | 0.48960 | 0.38000 | 0.45480 | 0.66380 | 0.27440 |
| 6 | 0.28080 | 0.33528 | 0.61792 | 0.29600 | 0.39096 | 0.69276 | 0.19488 |
| 7 | 0.15616 | 0.34706 | 0.64358 | 0.23920 | 0.41819 | 0.73855 | 0.21898 |
| 8 | 0.19123 | 0.20941 | 0.64872 | 0.22784 | 0.26364 | 0.64771 | 0.22380 |
| 9 | 0.21825 | 0.26188 | 0.68974 | 0.20557 | 0.25273 | 0.68954 | 0.18476 |
| 10 | 0.28365 | 0.35238 | 0.69795 | 0.20111 | 0.19055 | 0.65791 | 0.11695 |
| 11 | 0.39673 | 0.35048 | 0.67959 | 0.22022 | 0.17811 | 0.63158 | 0.06339 |
| 12 | 0.37935 | 0.39010 | 0.75592 | 0.28404 | 0.17562 | 0.60632 | 0.05268 |
| 13 | 0.31587 | 0.39802 | 0.71118 | 0.21681 | 0.19512 | 0.54126 | 0.01054 |
| 14 | 0.40317 | 0.39960 | 0.66224 | 0.18336 | 0.21902 | 0.54825 | 0.00211 |
| 15 | 0.54063 | 0.41992 | 0.69245 | 0.27667 | 0.24380 | 0.66965 | 0.00042 |
| 16 | 0.58813 | 0.38398 | 0.69849 | 0.25533 | 0.26876 | 0.77393 | 0.00008 |
| 17 | 0.57763 | 0.33680 | 0.71970 | 0.25107 | 0.35375 | 0.77479 | 0.00002 |
| 18 | 0.53553 | 0.42736 | 0.76394 | 0.17021 | 0.33075 | 0.71496 | 0.00000 |
| 19 | 0.40711 | 0.50547 | 0.81279 | 0.11404 | 0.24615 | 0.70299 | 0.00000 |
| 20 | 0.38142 | 0.50109 | 0.82256 | 0.12281 | 0.24923 | 0.76060 | 0.00000 |
| 21 | 0.27628 | 0.48022 | 0.82451 | 0.08456 | 0.18985 | 0.65212 | 0.00000 |
| 22 | 0.23526 | 0.49604 | 0.86490 | 0.05691 | 0.21797 | 0.65042 | 0.00000 |
| 23 | 0.26705 | 0.47921 | 0.89298 | 0.09138 | 0.14359 | 0.63008 | 0.00000 |
| 24 | 0.25341 | 0.49584 | 0.91860 | 0.13828 | 0.16872 | 0.70602 | 0.00000 |
| 25 | 0.25068 | 0.45917 | 0.96372 | 0.12766 | 0.19374 | 0.72120 | 0.00000 |
| 26 | 0.23014 | 0.43183 | 0.97274 | 0.12553 | 0.19875 | 0.68424 | 0.00000 |
| 27 | 0.24603 | 0.48637 | 0.97455 | 0.14511 | 0.19975 | 0.79685 | 0.00000 |
| 28 | 0.18921 | 0.51727 | 0.91491 | 0.20902 | 0.15995 | 0.85937 | 0.00000 |
| 29 | 0.23784 | 0.46345 | 0.90298 | 0.14180 | 0.15199 | 0.95187 | 0.00000 |
| 30 | 0.12757 | 0.43269 | 0.90060 | 0.12836 | 0.15040 | 0.97037 | 0.00000 |

The sequence with a low PAPR obtained in the present training process is shown as follows:

BTF$_{-128:127}$={0,0,0,0,0,0,0,0,0,0,0,0,0,0,0,0,0,0,0,0, 0,0,0,0,0,0,0,0,0,0, 0,0,0,0,0,0,−1,−1,1,−1,−1,1,1,−1,1,1,− 1,−1,1,1,−1,−1,−1,1,1,1,1,−1,−1,−1,−1,1,1,−1,−1,−1,−1,− 1,−1,1,1,1,1,1,1,1,1,1,1,1,−1,−1,1,1,1,1,−1,−1,−1,1,−1,1,1,−1,− 1,−1,−1,1,1,1,−1,1,1,1,1,−1,1,1,−1,−1,−1,−1,1,1,−1,−1,1,1,− 1,1,−1,1,1,1,−1,1,1,0,0,0,−1,1,−1,1,1,1,−1,1,1,1,−1,−1,− 1,−1,1,1,−1,1,1,1,−1,−1,−1,1,1,1,−1,1,1,1,1,−1,−1,−1,−1,−1,−1,1,1,1,1,− 1,1,−1,−1,−1,−1,−1,1,1,1,−1,1,−1,1,1,−1,−1,1,1,−1,−1,1,− 1,−1,1,−1,1,1,−1,1,1,1,1,1,1,1,1,1,1,−1,−1,1,1,−1,−1,1,−1,−1,1,− 1,1,1,1,1,−1,1,0,0,0,0,0,0,0,0,0,0,0,0,0,0,0,0,0,0,0,0,0,0,0,0, 0,0,0,0,0,0,0,0,0,0,0}

The present invention further provides a low PAPR sequence design method in another application scenario. The sequence generation method of the scenario is the same as what is mentioned above, and the specific parameters are set as follows: the length of the designed sequence is N=512, the training time is T=150, the number of sequences generated every time is J=200, a sampling coefficient is S=0.2, and a limiting position domain is represented as follows:

C=(−256,−176)∪(−1,+1)∪(+176,+255)

wherein (−256,176)∪(+176,+255) represents the positions of reserved subcarriers, the values thereof are set as 0, (−1,1) represents the positions of three DC subcarriers, and the values thereof are set as 0.

Figure 4:
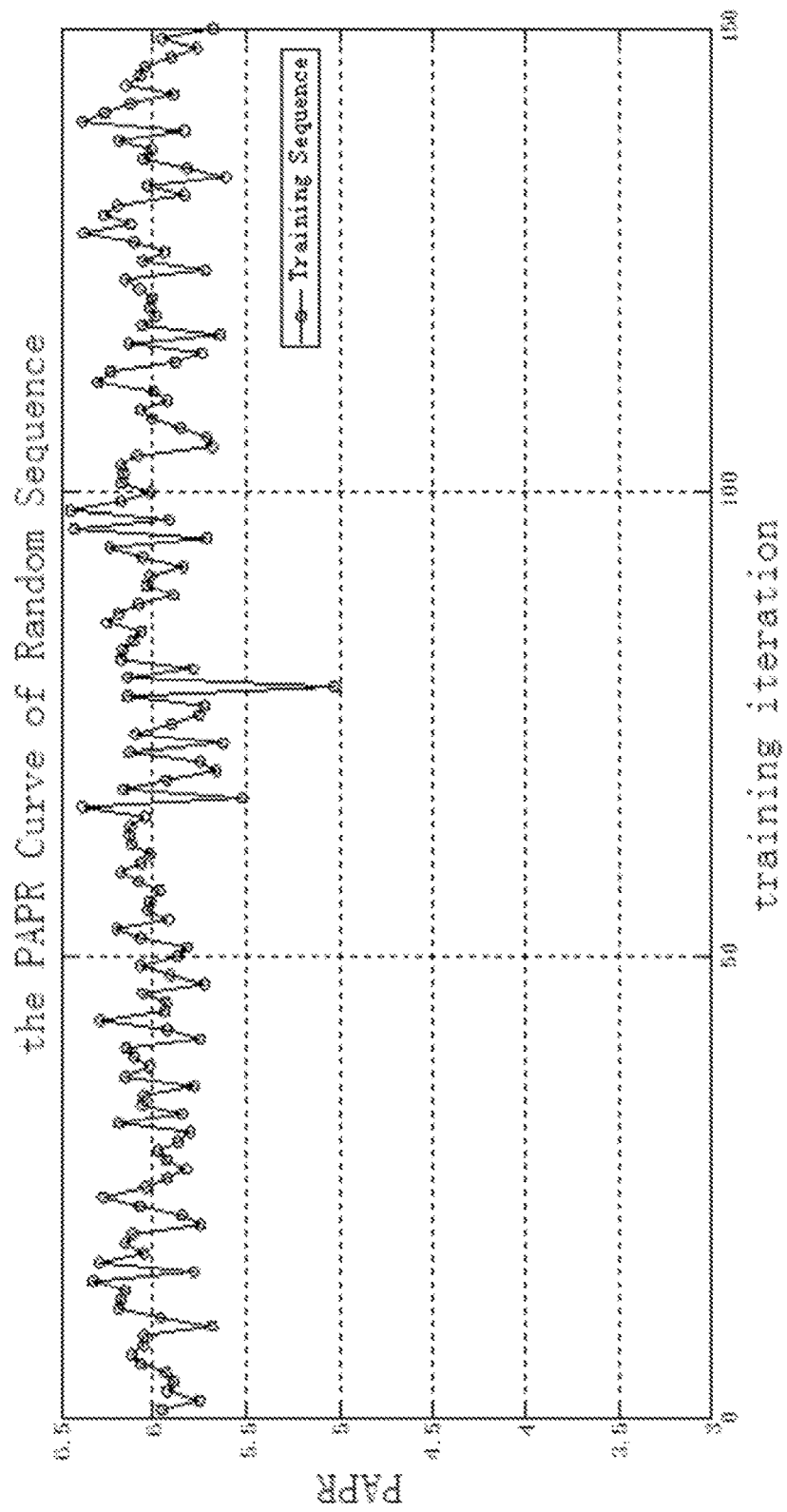
FIG. 4 is a trend line chart of every minimum PAPR value of 512-bit sequences randomly generated in 150 times.
Figure 5:
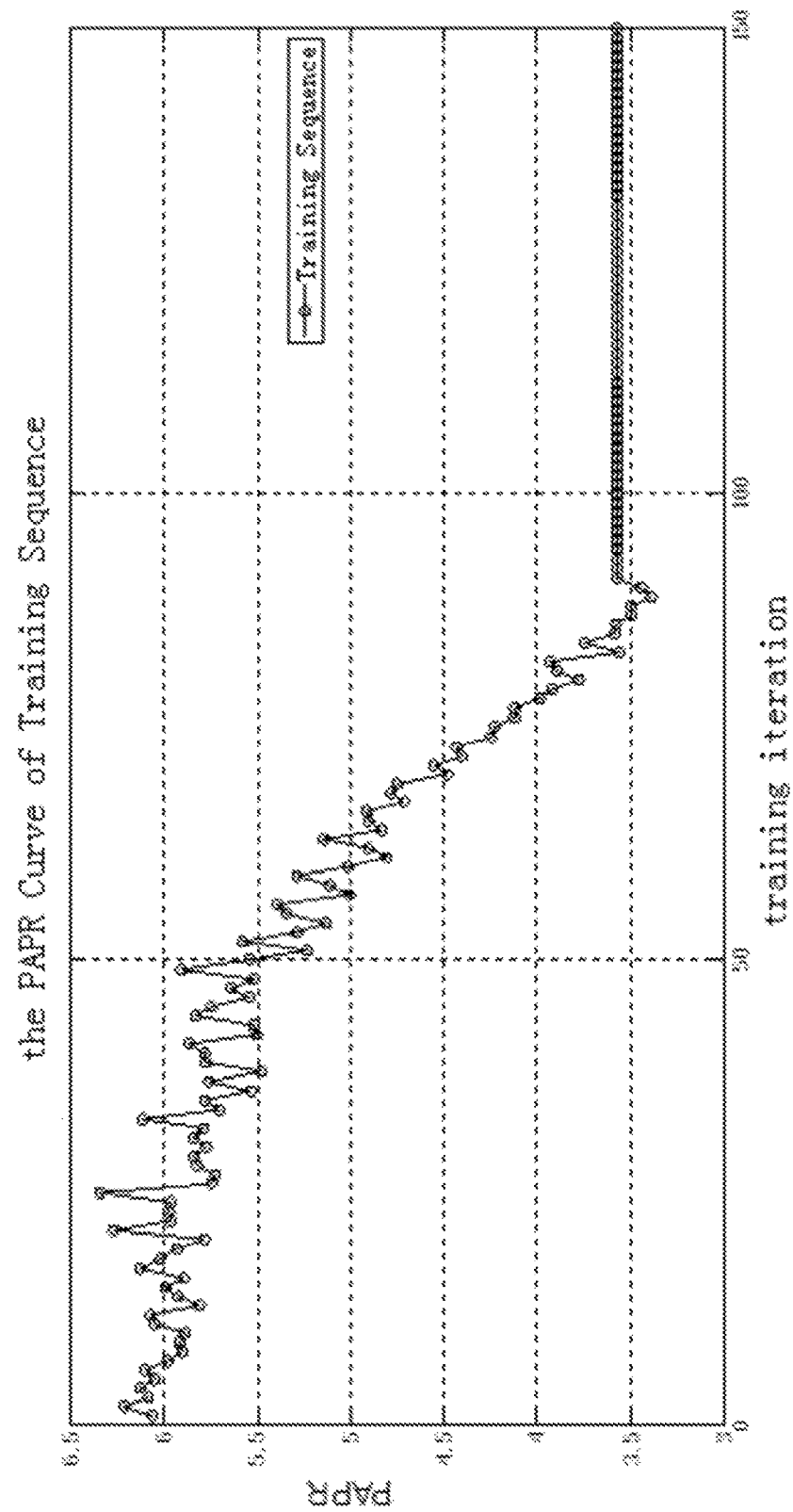
FIG. 5 is a trend line chart of every minimum PAPR value of 512-bit sequences iterating for 150 times in the present invention.

FIG. 4 represents a curve chart of the minimum PAPR value in each sequence in random sequences generated in 150 times without using the algorithm in the present invention. FIG. 5 shows a curve chart of the minimum PAPR value in each sequence in the sequences generated by 150 times of training by using the algorithm in the present invention. It can be obviously seen from the comparison of the two charts that the PAPR values of the randomly generated sequences fluctuate about 6 dB and fail for convergence. In the sequence designed by using the algorithm in the present invention, the convergence of the PAPR value of the designed sequence is realized quickly, and the minimum PAPR value of 3.57 dB of the present training is realized in the 90$^{th}$ training. In contrast, the PAPR of the 512-bit VHT-LTF sequence in the IEEE 802.11 ac protocol reaches 11.2 dB. The training change process of probability parameters occurring in the previous 30 times of training on −177 to −183 positions in the training process will be shown in the following table.

TABLE 2

Changes of probability parameters in previous 30 times of training on a part of positions of the 512-bit sequence

| Training times | Sequence position | | | | | | |
|---|---|---|---|---|---|---|---|
| | −177 | −178 | −179 | −180 | −181 | −182 | −183 |
| 1 | 0.50000 | 0.50000 | 0.50000 | 0.50000 | 0.50000 | 0.50000 | 0.50000 |
| 2 | 0.60000 | 0.46000 | 0.42000 | 0.52000 | 0.38000 | 0.54000 | 0.48000 |
| 3 | 0.60000 | 0.49200 | 0.38400 | 0.58400 | 0.29600 | 0.68800 | 0.47600 |
| 4 | 0.66000 | 0.61840 | 0.39680 | 0.59680 | 0.25920 | 0.59760 | 0.47520 |
| 5 | 0.59200 | 0.72368 | 0.39936 | 0.61936 | 0.25184 | 0.53952 | 0.27504 |
| 6 | 0.55840 | 0.70474 | 0.47987 | 0.64387 | 0.29037 | 0.50790 | 0.23501 |
| 7 | 0.59168 | 0.68095 | 0.39597 | 0.64877 | 0.25807 | 0.58158 | 0.20700 |
| 8 | 0.63834 | 0.79619 | 0.43919 | 0.54975 | 0.33161 | 0.65632 | 0.18140 |
| 9 | 0.64767 | 0.71924 | 0.48784 | 0.50995 | 0.30632 | 0.49126 | 0.21628 |
| 10 | 0.66953 | 0.70385 | 0.41757 | 0.44199 | 0.34126 | 0.37825 | 0.26326 |
| 11 | 0.67391 | 0.68077 | 0.40351 | 0.36840 | 0.38825 | 0.35565 | 0.17265 |
| 12 | 0.73478 | 0.65615 | 0.36070 | 0.33368 | 0.37765 | 0.35113 | 0.19453 |
| 13 | 0.78696 | 0.75123 | 0.35214 | 0.26674 | 0.33553 | 0.31023 | 0.11891 |
| 14 | 0.83739 | 0.79025 | 0.33043 | 0.37335 | 0.32711 | 0.38205 | 0.16378 |
| 15 | 0.88748 | 0.79805 | 0.28609 | 0.39467 | 0.30542 | 0.43641 | 0.13276 |
| 16 | 0.91750 | 0.73961 | 0.25722 | 0.39893 | 0.38108 | 0.40728 | 0.04655 |
| 17 | 0.90350 | 0.74792 | 0.25144 | 0.41979 | 0.43622 | 0.34146 | 0.04931 |
| 18 | 0.88070 | 0.82958 | 0.21029 | 0.46396 | 0.36724 | 0.34829 | 0.10986 |
| 19 | 0.87614 | 0.82592 | 0.24206 | 0.49279 | 0.43345 | 0.34966 | 0.10197 |
| 20 | 0.89523 | 0.76518 | 0.16841 | 0.47856 | 0.40669 | 0.36993 | 0.10039 |
| 21 | 0.89905 | 0.75304 | 0.19368 | 0.33571 | 0.44134 | 0.43399 | 0.14008 |
| 22 | 0.91981 | 0.69061 | 0.23874 | 0.40714 | 0.50827 | 0.40680 | 0.16802 |
| 23 | 0.86396 | 0.73812 | 0.28775 | 0.46143 | 0.52165 | 0.40136 | 0.11360 |
| 24 | 0.89279 | 0.78762 | 0.33755 | 0.43229 | 0.54433 | 0.40027 | 0.02272 |
| 25 | 0.95856 | 0.75752 | 0.30751 | 0.38646 | 0.46887 | 0.46005 | 0.00454 |
| 26 | 0.95171 | 0.75150 | 0.32150 | 0.51729 | 0.49377 | 0.31201 | 0.00091 |
| 27 | 0.93034 | 0.75030 | 0.22430 | 0.56346 | 0.45875 | 0.30240 | 0.00018 |
| 28 | 0.96607 | 0.79006 | 0.20486 | 0.51269 | 0.45175 | 0.36048 | 0.00004 |
| 29 | 0.97321 | 0.79801 | 0.32097 | 0.52254 | 0.43035 | 0.35210 | 0.00001 |
| 30 | 0.97464 | 0.85960 | 0.24419 | 0.50451 | 0.42607 | 0.49042 | 0.00000 |

The sequence with a low PAPR obtained in the present training process is shown as follows:

BTF$_{-256:255}$={0,0,0,0,0,0,0,0,0,0,0,0,0,0,0,0,0,0,0,0, 0,0,0,0,0,0,0,0,0, 0,0,0,0,0,0,0,0,0,0,0,0,0,0,0,0,0,0,0,0, 0,0,0,0,0,0,0,0,0,0,0,0,0,0,0,0,0,0,0,0,0, 1,1,−1,1,−1,1,− 1,−1,1,1,−1,1,1,−1,−1,−1,−1,1,1,−1,−1,−1,1,−1,−1,1,1,− 1,−1,−1,−1,−1,−1,1,1,1,1,−1,1,−1,−1,1,1,−1,−1,1,1,−1, 1,−1,1,1,1,−1,1,1,1,−1,−1,−1,1,1,−1,1,1,1,−1,−1,−1,1,− 1,−1,−1,1,1,−1,−1,−1,−1,1,1,1,−1,−1,1,1,−1,−1,−1,−1,1, 1,1,1,−1,1,1,1,1,−1,−1,−1,−1,1,1,1,1,1,−1,1,1,−1,1,−1,−1, 1,1,−1,1,1,1,−1,−1,1,−1,1,−1,1,−1,1,−1,1,−1,−1,1,−1,1,1,1, 1,1,1,−1,−1,1,1,−1,−1,1,1,1,−1,1,−1,1,−1,−1,−1,−1,1,1,− 1,1,−1,1,1,1,1,−1,−1,−1,−1,1,0,0,0,1,1,−1,1,1,−1,1,1,1,−1,1, 1,1,−1,1,1,−1,1,1,1,1,−1,1,1,1,1,−1,−1,−1,−1,1,1,1,−1,1,− 1,−1,1,−1,1,1,1,1,−1,1,1,−1,−1,1,−1,−1,−1,1,1,−1,1,−1,− 1,1,1,1,1,−1,−1,−1,1,1,−1,1,1,1,1,1,−1,−1,1,1,1,1,−1,1,1,1,−1, 1,−1,1,−1,1,−1,−1,−1,1,1,1,1,−1,1,1,1,1,−1,1,1,1,1,−1, 1,1,−1,−1,1,−1,1,−1,1,−1,1,−1,1,1,1,−1,1,−1,−1,−1,1,−1,1, 1,1,1,1,−1,−1,1,1,1,1,1,1,−1,1,1,1,1,−1,−1,1,1,−1,1,−1,−1,− 1,−1,−1,−1,1,1,−1,1,−1,1,−1,1,1,1,−1,1,−1,−1,−1,−1,− 1,−1,0,0,0,0,0,0,0,0,0,0,0,0,0,0,0,0,0,0,0,0,0,0,0,0,0,0,0,0, 0,0,0,0,0,0,0,0,0,0,0,0,0,0,0, 0,0,0,0,0,0,0,0,0,0,0,0,0,0,0,0,0, 0,0,0,0,0,0,0,0,0,0,0,0,0,0,0}

The invention claimed is:

1. A computer-implemented method for providing low Peak to Average Power Ratio (PAPR) sequence design for a Orthogonal Frequency Division Multiplexing (OFDM) wireless communication system, the sequence with a low PAPR only contains elements −1 and +1, wherein the computer-implemented method comprises the following steps:

setting relevant parameters of a designed sequence at first, wherein multiple iterations are executed until conforming to a termination condition, generating multiple length-designated sequences having elements of 0 and 1 and obeying the Bernoulli distribution of designated probability density parameters according to the parameters during primary iteration, screening the generated sequences according to the PAPRs of the sequences, wherein a minimum PAPR is electronically selected, wherein a threshold of the PAPR is electronically set and is used for screening the generated sequences, updating the parameters of the next iteration based on the screened sequences, mapping the sequence having the minimum PAPR to obtain a sequence with a low PAPR with elements of −1 and 1 after terminating the iterations, and transmitting or receiving wireless signals based on at least a portion of the sequence with the low PAPR via the OFDM wireless communication system.

2. The computer-implemented method of claim 1, wherein the relevant parameters of the designed sequence comprise: a sequence length N; the number J of random sequences generated every time; a sampling coefficient S, 0<S<1; an initial probability density function parameter $u=\{u_n\}_{n=1}^{N}$; an iteration termination condition: iteration times T and/or a convergence condition threshold ε; and an initial PAPR value $V_{PAPR}^{old}$;

the then carrying out multiple iterations until conforming to a termination condition, generating multiple length-designated sequences having elements of 0 and 1 and obeying the Bernoulli distribution of designated probability density parameters according to the parameters during primary iteration, screening the generated sequences according to the PAPRs of the sequences, updating the parameters of the next iteration based on the screened sequences, and mapping the sequence having the minimum PAPR to obtain a sequence with a low PAPR with elements of −1 and 1 after terminating the iterations, specifically comprise:

(2) generating J random sequences obeying the Bernoulli distribution of parameters $u=\{u_n\}_{n=1}^{N}$ by using the Monte Carlo method;

(3) calculating the PAPRs of mapping sequences $Q_j \in \{-1,+1\}^N$ of the generated sequences $P_j \in \{0,1\}^N$, selecting the minimum PAPR from J PAPRs, marking the same as $V_{PAPR}^{new}$, and setting the threshold γ of the PAPR, wherein the threshold is used for screening the sequences participating in the calculation of updating iteration parameters;

(4) judging whether the iteration termination condition is satisfied, if so, executing step (6), and otherwise, executing step (5); in the case that the iteration times are set, the termination condition comprises reaching to the iteration times, and in the case that the convergence condition threshold is set, the termination condition comprises $|V_{PAPR}^{new}-V_{PAPR}^{old}| \leq \varepsilon$;

(5) updating $V_{PAPR}^{old}$ and $u=\{u_n\}_{n=1}^{N}$, and transmitting the value of the $V_{PAPR}^{new}$ to the $V_{PAPR}^{old}$, wherein $u_n$ is set according to the numerical value distribution of the $n^{th}$ sequence in all sequences conforming to the threshold conditions of the PAPR in step (3); and executing step (2) to enter the next iteration; and (6) mapping the sequence $\hat{P} \in \{0,1\}^N$ corresponding to the minimum PAPR in step (3) to $\hat{Q} \in \{-1,+1\}^N$, wherein the obtained $\hat{Q}$ is the designed sequence.

3. The computer-implemented method of claim 2, wherein the relevant parameters of the designed sequence further comprise: a limiting position domain C and a limiting position value W; and the sequences generated in step (2) are represented as follows:

$$P_j = \{P_{j,n}\}_{n=1}^{N} = \begin{cases} P_{j,n} \sim Ber(u_n), n \notin C \\ P_{j,n} = w_n, n \in C \end{cases}, j = 1, \ldots, J,$$

wherein $w_n \in W$ represents the value of a limiting position element.

4. The computer-implemented method of claim 2, wherein a mapping function of the mapping sequences $Q_j \in \{-1,+1\}^N$ of the sequences $P_j \in \{0,1\}^N$ in step (3) is $Q_j=1-2P_j$, $P_j$, $Q_j$, 1 all represent N-dimensional vectors; the formula for calculating the PAPRs of the mapping sequences $Q_j \in \{-1,+1\}^N$ of the sequences $P_j \in \{0,1\}^N$ in step (3) is as follows:

$$F(P_j) = 10\log_{10} \frac{\max\{|x(1-2P_j)|^2\}}{E[|x(1-2P_j)|^2]}$$

wherein, x( ) represents IFFT, E[ ] represents mathematical expectation, and max{ } represents taking the maximum value.

5. The computer-implemented method of claim 2, wherein the specific steps of selecting the minimum PAPR from J PAPRs, marking the same as $V_{PAPR}^{new}$, and setting the threshold γ of the PAPR in step (3) comprise:

(3.1) carrying out ascending sorting on F(j), j=1, . . . , J to obtain $\tilde{F}(j)$, wherein F(j) represents the PAPR of the sequence j;

(3.2) selecting the minimum PAPR $V_{PAPR}^{new}=\tilde{F}(1)$; and (3.3) setting the threshold of the PAPR as $\gamma=\tilde{F}(\lceil J \cdot S \rceil)$, wherein $\lceil \ \rceil$ represents an upward rounding function.

6. The computer-implemented method of claim 2, wherein in step (5), the formula for setting $u_n$ according to the numerical value distribution condition of the $n^{th}$ sequence in all the sequences conforming to the threshold conditions of the PAPR in step (3) is as follows:

$$u_n = \frac{\sum_{j=1}^{J} \amalg(F(P_j) \leq \gamma) P_{j,n}}{\sum_{j=1}^{J} \amalg(F(P_j) \leq \gamma)}, n = 1, \ldots, N$$

wherein, $\amalg( \ )$ represents an indicating function: when and only when $F(P_j) \leq \gamma$, $\amalg(F(P_j) \leq \gamma)$ is equal to 1, and otherwise is 0; and $P_{j,n}$ represents the value of the $n^{th}$ element of the generated $j^{th}$ sequence.

* * * * *